United States Patent
Yip et al.

(10) Patent No.: US 12,062,215 B2
(45) Date of Patent: Aug. 13, 2024

(54) METHOD AND DEVICE FOR PERFORMING RENDERING USING LATENCY COMPENSATORY POSE PREDICTION WITH RESPECT TO THREE-DIMENSIONAL MEDIA DATA IN COMMUNICATION SYSTEM SUPPORTING MIXED REALITY/AUGMENTED REALITY

(71) Applicant: Samsung Electronics Co., Ltd., Gyeonggi-do (KR)

(72) Inventors: Eric Yip, Gyeonggi-do (KR); Hyunkoo Yang, Gyeonggi-do (KR); Jaeyeon Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/015,858

(22) PCT Filed: Jul. 13, 2021

(86) PCT No.: PCT/KR2021/008978
§ 371 (c)(1),
(2) Date: Jan. 12, 2023

(87) PCT Pub. No.: WO2022/015020
PCT Pub. Date: Jan. 20, 2022

(65) Prior Publication Data
US 2023/0316583 A1    Oct. 5, 2023

(30) Foreign Application Priority Data

Jul. 13, 2020   (KR) .................. 10-2020-0086178

(51) Int. Cl.
*G06F 3/01*     (2006.01)
*G06T 9/00*     (2006.01)
(Continued)

(52) U.S. Cl.
CPC .............. *G06T 9/001* (2013.01); *G06F 3/012* (2013.01); *G06T 15/10* (2013.01); *G06T 19/00* (2013.01); *G06T 2210/56* (2013.01)

(58) Field of Classification Search
CPC ......... G06T 9/001; G06T 15/10; G06T 19/00; G06T 2210/56; G06F 3/012
See application file for complete search history.

(56) References Cited

U.S. PATENT DOCUMENTS 9,779,479 B1 *   10/2017  Makinen ................. G06T 17/00
2016/0080739 A1   3/2016  Perlman et al.
(Continued)

FOREIGN PATENT DOCUMENTS

KR   10-2018-0016973   2/2018
KR   10-2018-0051067   5/2018

OTHER PUBLICATIONS

PCT/ISA/210 Search Report issued on PCT/KR2021/008978, Oct. 5, 2021, pp. 5.
(Continued)

*Primary Examiner* — Towfiq Elahi
(74) *Attorney, Agent, or Firm* — The Farrell Law Firm, P.C.

(57) ABSTRACT

The present disclosure relates to a method and device for using latency compensatory pose prediction with respect to three-dimensional (3D) media data to perform rendering in a communication system supporting mixed reality (XR)/augmented reality (AR). According to an embodiment of the present disclosure, a method for a first device, which receives 3D media data from a media server in a communication system, to perform rendering comprises the steps of: receiving, from AR glasses, pose prediction-related information including pose information of a first point in time; performing pose prediction of a second point in time, at which 2-dimensional (2D) rendering is to be performed in
(Continued)

the AR glasses, on the basis of the pose prediction-related information; rendering one or a plurality of 2D pose prediction rendering views with respect to the received 3D media data on the basis of one or a plurality of pieces of predicted pose information of the second point in time; and transmitting, to the AR glasses, 2D media data compressed by encoding the one or plurality of 2D pose prediction rendering views.

12 Claims, 11 Drawing Sheets

(51) Int. Cl.
*G06T 15/10* (2011.01)
*G06T 19/00* (2011.01)

(56) References Cited

U.S. PATENT DOCUMENTS

| | | | |
|---|---|---|---|
| 2016/0364904 A1* | 12/2016 | Parker | G06F 3/038 |
| 2017/0115488 A1 | 4/2017 | Ambrus et al. | |
| 2017/0148206 A1 | 5/2017 | Donner et al. | |
| 2018/0081429 A1 | 3/2018 | Akenine-Moller et al. | |
| 2018/0357809 A1 | 12/2018 | Lawless et al. | |

OTHER PUBLICATIONS

PCT/ISA/237 Written Opinion issued on PCT/KR2021/008978, Oct. 5, 2021, pp. 5.
European Search Report dated Oct. 18, 2023 issued in counterpart application No. 21841748.3-1224, 7 pages.

* cited by examiner

METHOD AND DEVICE FOR PERFORMING RENDERING USING LATENCY COMPENSATORY POSE PREDICTION WITH RESPECT TO THREE-DIMENSIONAL MEDIA DATA IN COMMUNICATION SYSTEM SUPPORTING MIXED REALITY/AUGMENTED REALITY

CROSS-REFERENCE TO RELATED APPLICATION(S)

This application is a National Phase Entry of PCT International Application No. PCT/KR2021/008978, which was filed on Jul. 13, 2021 and claims priority to Korean Patent Application No. 10-2020-0086178, which was filed on Jul. 13, 2020 in the Korean Intellectual Property Office, the contents of which are incorporated herein by reference.

BACKGROUND

1. Field

The disclosure relates to a method and device for rendering 3D media data in a communication system supporting mixed reality (XR)/augmented reality (AR).

2. Description of the Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

The disclosure provides a method and device for efficiently rendering 3D media data in a communication system supporting XR/AR.

The disclosure also provides a method and device for performing remote or split rendering using latency compensated pose prediction (LCPP) for 3D media data in a communication system supporting XR/AR.

According to an embodiment of the disclosure, a method for performing rendering by a first device receiving 3D media data from a media server in a communication system comprises receiving pose prediction-related information including pose information of a first time from augmented reality (AR) glasses, performing pose prediction of a second time at which 2D rendering is to be performed by the AR glasses, based on the pose prediction-related information, rendering one or more 2D pose prediction rendered views for the received 3D media data, based on one or more pieces of predicted pose information of the second time, and transmitting 2D media data compressed by encoding the one or more 2D pose prediction rendered views to the AR glasses.

According to an embodiment of the disclosure, a method for performing rendering by augmented reality (AR) glasses communicatively connected with a first device receiving 3D media data from a media server in a communication system comprises transmitting pose prediction-related information including pose information of a first time to the first device, receiving compressed media data including one or more 2D pose prediction rendered views for the 3D media data from the first device, based on the pose information of the first time, decoding media data of a rendered view selected from among the one or more 2D pose prediction rendered views, and compensating for a frame error mismatch of the selected rendered view, based on pose information of a second time at which 2D rendering is to be performed on the selected rendered view by the AR glasses. The one or more 2D pose prediction rendered views are pose-predicted for the second time at which the 2D rendering is to be performed by the AR glasses.

According to an embodiment of the disclosure, a first device receiving 3D media data from a media server in a communication system comprises a transceiver and a processor configured to receive, through the transceiver, pose prediction-related information including pose information of a first time from augmented reality (AR) glasses, perform pose prediction of a second time at which 2D rendering is to be performed by the AR glasses, based on the pose prediction-related information, render one or more 2D pose prediction rendered views for the received 3D media data, based on one or more pieces of predicted pose information of the second time, and transmit, through the transceiver, 2D media data compressed by encoding the one or more 2D pose prediction rendered views to the AR glasses.

According to an embodiment of the disclosure, augmented reality (AR) glasses communicatively connected with a first device receiving 3D media data from a media server in a communication system comprise a transceiver and a processor configured to transmit, through the transceiver, pose prediction-related information including pose information of a first time to the first device, receive, through the transceiver, compressed media data including one or more 2D pose prediction rendered views for the 3D media data from the first device, based on the pose information of the first time, decode media data of a rendered view selected from among the one or more 2D pose prediction rendered views, and compensate for a frame error mismatch of the selected rendered view, based on pose information of a second time at which 2D rendering is to be performed on the selected rendered view by the AR glasses. The one or more 2D pose prediction rendered views are pose-predicted for the second time at which the 2D rendering is to be performed by the AR glasses.

According to the disclosure, rendering errors are reduced by predicting the user's pose as well as the rendering time, according to the rendering time. Moreover, latency variations in media system configuration may be dynamically compensated for by using the time prediction operation mentioned in this disclosure.

The use of multiple predictions (not only rendering time predictions, but also multiple pose predictions for any given prediction time) allows 3D rendering of multi-pose predicted views. By rendering according to the disclosure, and subsequent selection of the best pose predicted view, low latency split/remote rendering is possible with reduced or minimized rendering errors (as compared to the background techniques).

DETAILED DESCRIPTION

Figure 1:
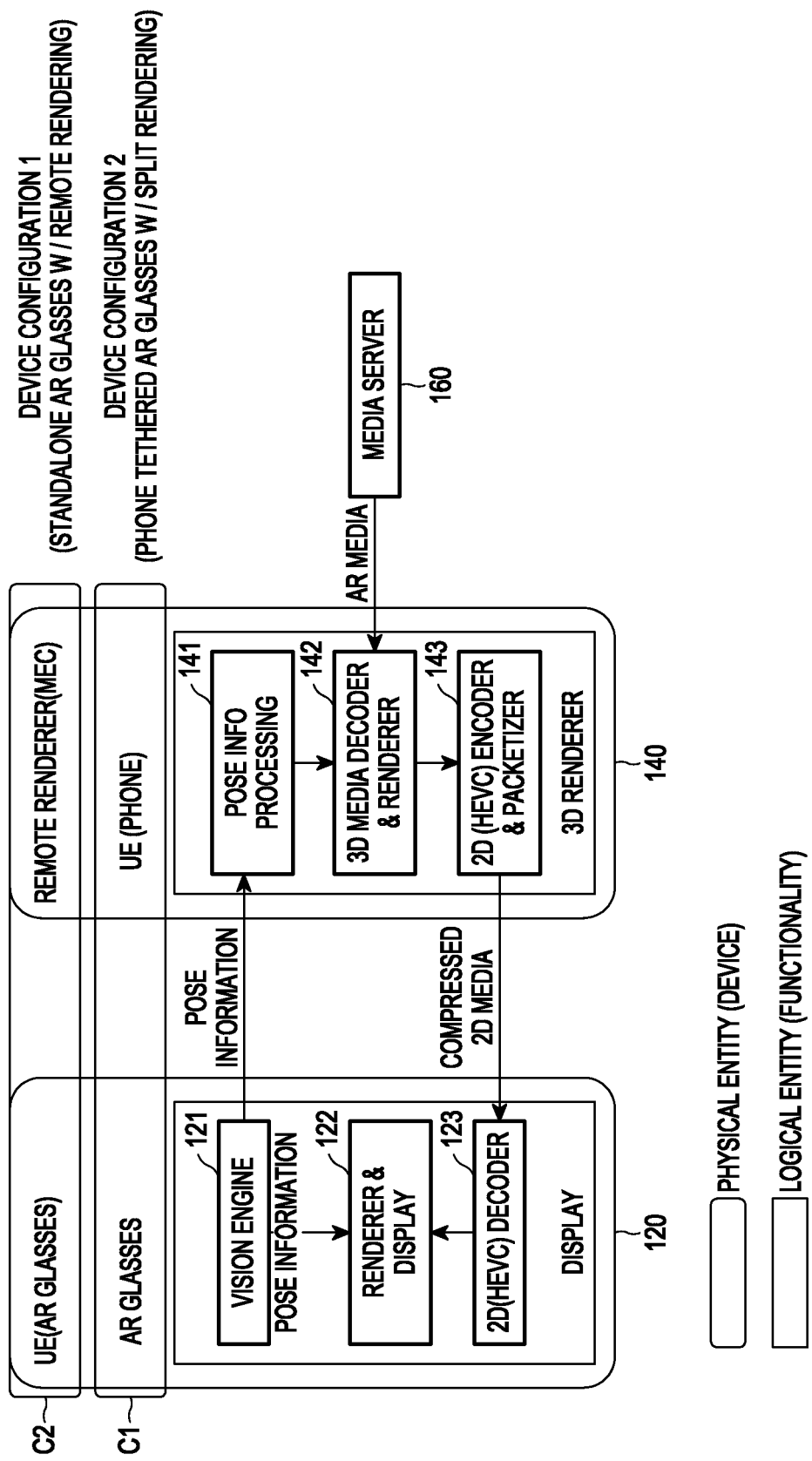
FIG. 1 is a view illustrating an example of remote/split rendering in a communication system supporting XR/AR.

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure. For the same reasons, some elements may be exaggerated or schematically shown. The size of each element does not necessarily reflects the real size of the element. The same reference numeral or denotation is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart. Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions. As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure. Hereinafter, terms denoting broadcast information, terms denoting control information, communication coverage-related terms, terms (e.g., event) denoting state variations, terms denoting network entities, terms denoting messages, or terms denoting device components are provided solely for illustration purposes. The disclosure is not limited to the terms, and other terms equivalent in technical concept may also be used.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

The conventional processing functions necessary for 2D media (image) capture, transfer, and rendering are general and are basically implemented in many devices, such as smartphones or TVs.

In contrast, 3D media captured for mixed reality (XR) and augmented reality (AR) (e.g., point cloud and mesh) are based on 3D representations of actual objects and scenes and thus requires tremendous processing capability for rendering as well as capturing, 3D modeling, and transfer. As 5G services supporting low latency and high-bandwidth data channels expand, processing requirements for 3D content rendering are very burdensome. Thus, remote rendering of 3D media content in cloud (cloud server or multi-access edge computing (MEC)) according to the user's pose information is a common solution for offloading the rendering function on the user's terminal device. As AR glasses are introduced, a similar approach may be found in split rendering. Rendering of 3D media content is split between the AR glasses device and the tethered mobile phone. Before further advance in hardware technology to support, e.g., enhanced battery life, processing capability, and display technology, which enables a lightweight, standalone form factor for AR glasses, split rendering between the tethered device and the AR glasses is a technique necessary to achieve augmented reality using the AR glasses.

The disclosure relates to the processing, transfer, decoding, and mixed reality (XR) and augmented reality (AR) content rendering of multimedia content including 3D media represented as point clouds and meshes. The disclosure also relates to tethered AR glasses split rendering, tethered AR glasses remote rendering, and standalone AR glasses remote rendering. The disclosure also relates to pose prediction for split/remote rendering and latency compensated pose prediction-based remote/split rendering for AR/XR. Further, although the description of the disclosure focuses on AR glasses for convenience of description, the disclosure may be likewise applied to various devices capable of displaying virtual reality (VR) or 3D media data.

FIG. 1 is a view illustrating an example of remote/split rendering in a communication system supporting XR/AR.

FIG. 1 exemplifies a configuration in which remote rendering or split rendering is performed between two devices 120 and 140 in a communication environment in which AR data, as multimedia content, is provided from a media server 160. In a configuration C1, the device 120 may be a user equipment (UE), such as a smartphone, or AR glasses, and the device 140 may be a cloud network-based MEC. In the C1 configuration, remote rendering is performed on AR data between the devices 120 and 140. In a configuration C2, the device 120 may be AR glasses, and the device 140 may be a UE. In the C2 configuration, split rendering is performed on AR data between the devices 120 and 140.

The device 120 of FIG. 1 includes a vision engine 121, a renderer and display 122, and a 2D decoder 123, and the device 140 includes a pose information processing unit 141, a 3D media decoder and renderer 142, and a 2D encoder and packetizer 143. In the disclosure, in the example of FIG. 1 and other examples to be described below, high efficiency video coding (HEVC) is exemplified as the coding scheme in the 2D encoder and 2D decoder, but it should be noted that the coding scheme is not limited to HEVC.

In FIG. 1, the vision engine 121 obtains the user's pose information and provides it to the pose information processing unit 141. The 3D media decoder and renderer 142 decodes and renders the AR media data, which is 3D media data, received from the media server 160 based on the pose information processed from the pose information processing unit 141 and outputs it to the 2D encoder and packetizer 143. The 2D decoder 123 decodes the compressed 2D media data received from the 2D encoder and packetizer 143 and outputs it to the renderer and display 122. The renderer and display 122 renders the decoded 2D media data based on the pose information provided from the vision engine 121 and outputs it to be displayed. FIG. 1 illustrates an example of a configuration for remote/split rendering in which rendering for 3D media data requiring a relatively high processing capability is performed by the device 140, and rendering for 2D media data requiring a relatively low processing capability is performed by the device 120.

In other words, the example of FIG. 1 may be understood as illustrating different device configurations according to two configurations C1 and C2 below for AR glasses:

C1. Standalone AR glasses by remote rendering on the cloud (MEC), and

C2. AR glasses using smartphone tethering by split rendering between AR glasses and a UE, such as a smartphone.

In FIG. 1, logical (functional) entities may be classified as a display entity and a 3D renderer entity. In the case of the configuration of the two devices 120 and 140, since a wireless data communication channel is present 1) between the AR glasses and the remote renderer or 2) between the AR glasses and the UE, the 3D rendered 2D view output from the 3D media decoder and renderer 142 should be compressed before transmitted to the AR glasses through the data channel.

There are two service use cases (as described in connection with device configuration 2 C2):

1. The UE 140 downloads complete 3D(AR) media data from the media server 160, provided to the AR glasses.

2. The media server 160 then streams the media data provided on the AR glasses to the UE 140. The 3D media data may be streamed as a, b, and c below:
 a. Full 3D media object
 b. Any perspective/view of the object
 c. Customized perspective/view of the object FIG. 2 is a view illustrating another example of split rendering in a communication system supporting XR/AR.

Figure 2:
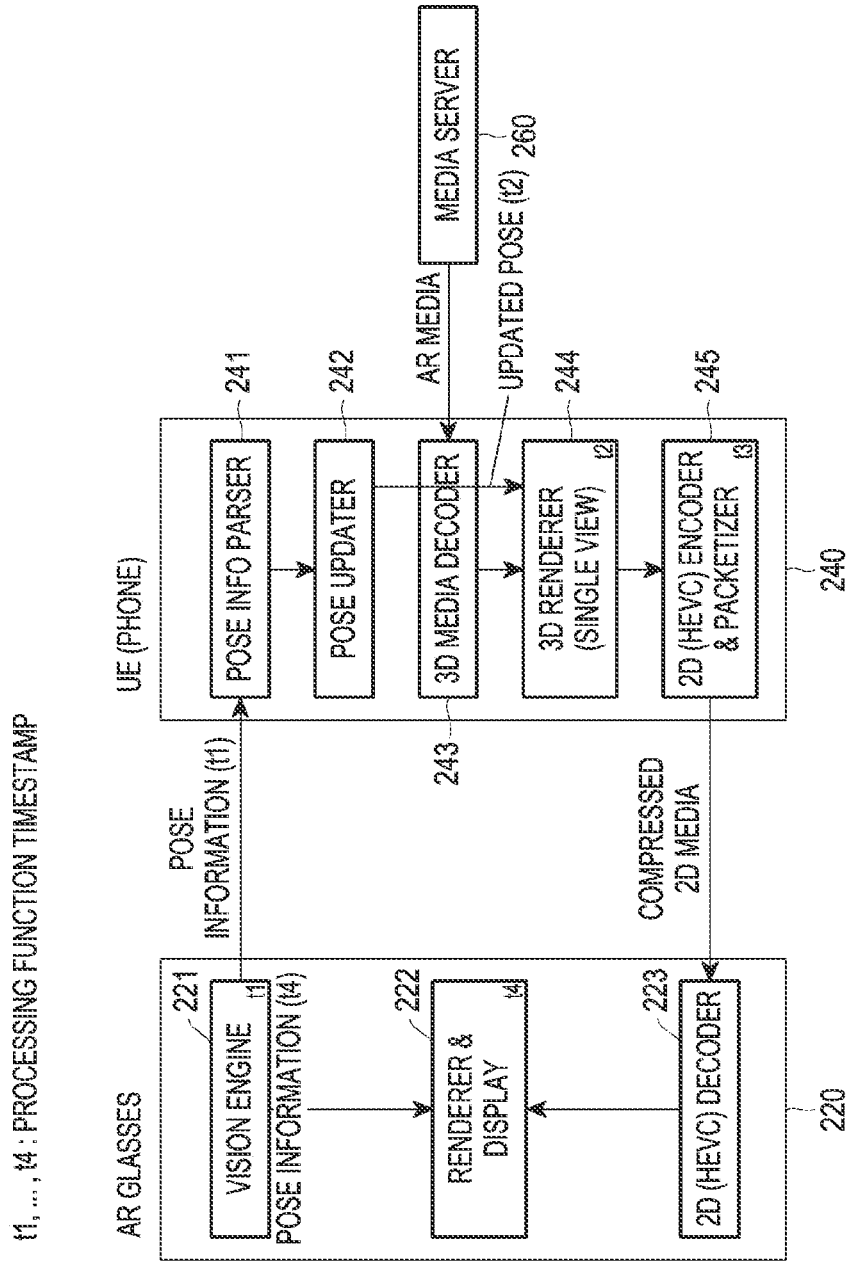
FIG. 2 is a view illustrating another example of split rendering in a communication system supporting XR/AR.

FIG. 2 exemplifies a configuration in which split rendering is performed between two devices 220 and 240 in a communication environment in which AR data, as multimedia content, is provided from a media server 260. In FIG. 2, the device 220 may be AR glasses, and the device 240 may be a UE. Split rendering is performed on AR data between the devices 220 and 240. The AR glasses 220 of FIG. 2 include a vision engine 221, a renderer and display 222, and a 2D decoder 223, and the UE 240 includes a pose information parser 241, a pose updater 242, a 3D media decoder 243, a 3D renderer 244, and a 2D encoder and packetizer 245. FIG. 2 illustrates an example of a configuration for split rendering in which rendering for 3D media data requiring a relatively high processing capability is performed by the UE 240, and rendering for 2D media data requiring a relatively low processing capability is performed by the AR glasses 220. The AR glasses 220 may be connected to the UE 240 through tethering to receive the media data split rendered by the UE 240.

In the example of FIG. 2, the UE 240 may download the 3D media data from the glass media server 260 and provide it to the AR glasses 220. Split rendering is performed between the UE 240 and the AR glasses 220.

In the example of FIG. 2, specific operations of performing split rendering are operations 201 to 209 below.

201. The UE 240 downloads 3D media data from the media server 260.

202. The AR glasses 220 transmits user pose information @t1 at time t1 to the UE 240, and the pose information parser 241 parses the pose information.

203. The UE 240 depacketizes and decodes the 3D media data received from the media server 260 and then renders the output 2D view video frame according to the pose information updated according to time t2.

204. The UE 240 encodes and packetizes the view (using a 2D codec) rendered in operation 203.

205. The UE 240 sends the compressed media packet to the AR glasses 220.

206. The AR glasses 220 depacketizes and decodes the rendered view frame received from the UE 240.

207. The AR glasses 220 compensates for an error mismatch of the rendered view frame received from the UE 240 using the latest pose information @t4 at time t4 (e.g., time warping and late stage reprojection known in image processing art may be used).

In the example of FIG. 2, the pose information at times t1, t2, and t4 may be defined as specifying the position and orientation of space, as in 3GPP TR 26.928 (extended reality (XR) in 5G): In embodiments of the disclosure, the pose information may use a scheme as defined in 3GPP TR 26.928 or various known schemes capable of defining a position and an orientation in space.

1. Position (x, y, z): 3D vector or physical distance from the origin in space
2. Direction (x, y, z, w): a quaternion relative to the same space Meanwhile, in an embodiment, some of operations 201 to 207 described in the example of FIG. 2 may be omitted, or other necessary actions may be added. Further, each operation may be performed in an order different from the execution order of the operations of the above-described procedure.

In the communication system supporting the AR glasses, split rendering or remote rendering requires a number of processing operations in the media pipeline as illustrated in FIG. 2. Various processing operations cause rendering errors due to a latency between time t2 and time t4. 3D rendering is performed at time t2 using the pose information updated at the corresponding time (e.g., updated pose information at time t2), but the actual rendering and display time on AR glasses for the user is time t4. Further, during the latency between time t2 and time t4, the user may have already moved. Therefore, a method for effectively compensating for a rendering error caused due to latency occurring during split rendering or remote rendering is required.

Figure 3:
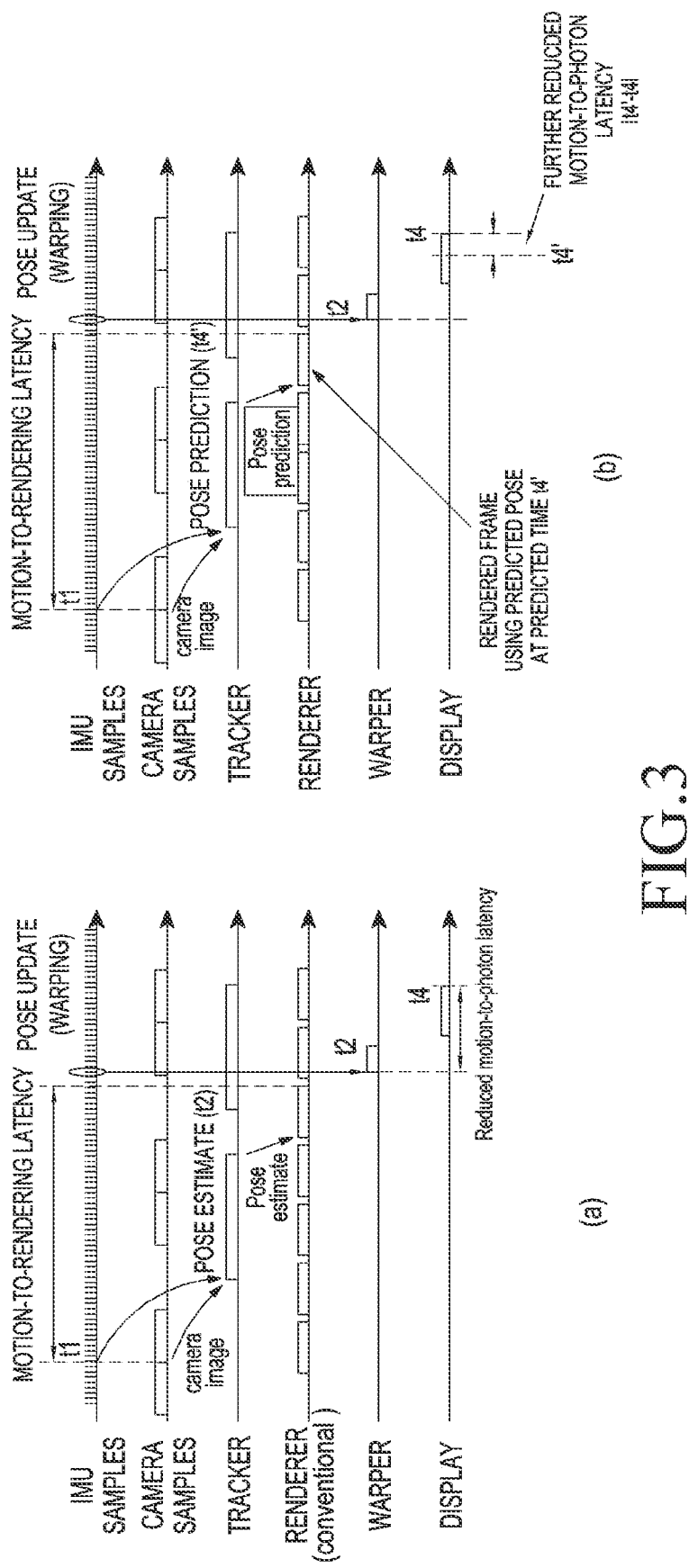
FIG. 3 is a view illustrating a method for updating pose information according to an embodiment of the disclosure.

FIG. 3 is a view illustrating a method for updating pose information according to an embodiment of the disclosure. In (a) and (b) of FIG. 3, inertial measurement unit (IMU) samples are samples obtained by sensing the motion (e.g., head motion) of an object through a sensor, such as a gyroscope or an accelerometer, and camera samples are samples obtained by detecting the motion of the object through a camera. These samples may be processed by a tracker as sensing data, obtaining pose information including position and orientation information about the object. Thereafter, rendering is performed on the media data based on the pose information and is displayed through the AR glasses or the UE.

(a) of FIG. 3 illustrates motion to photo latency when using estimated pose information calculated at time t2 for 3D rendering at time t2 as in the example of FIG. 2. Here, the motion to photon latency means a latency taken for the screen according to the view changed according to the user's head motion to be displayed. If the motion to photon latency prolongs, the user may feel dizzy.

(b) of FIG. 3 illustrates a motion to photon latency when using a predicted pose calculated based on at t4' which is a future display (2D rendering) time predicted for 3D rendering at time t2 according to an embodiment of the disclosure.

Assuming that the user's pose information is precisely predicted using a motion vector predictor to be described below, in (b) of FIG. 3 proposed in the disclosure, as compared with (a) of FIG. 3, the motion to photon latency may be further reduced to efficiently compensate for rendering errors on split/remote rendering.

The latency causing a rendering error may differ depending on i) the number of processing steps for the configuration and ii) a difference in processing latency on each step according to the complexity of the processing task on each specific 3D media content (e.g., decoding a cloud with one million points generally takes longer than decoding a cloud with 500,000 points).

As an example, embodiments of the disclosure propose a scheme for predicting time t4' to be rendered and pose information P'(t4') predicted according to the predicted rendering time t4' instead of simply updating pose information at 3D rendering time t2 and using the updated pose information P(t2) for rendering. Further, in the disclosure, a plurality of poses for the user may be predicted and used for rendering 3D media data and, then, the actual pose may be used at the actual rendering time known to the AR glasses to select the most accurate rendered view according to multiple minimization error functions.

Figure 4:
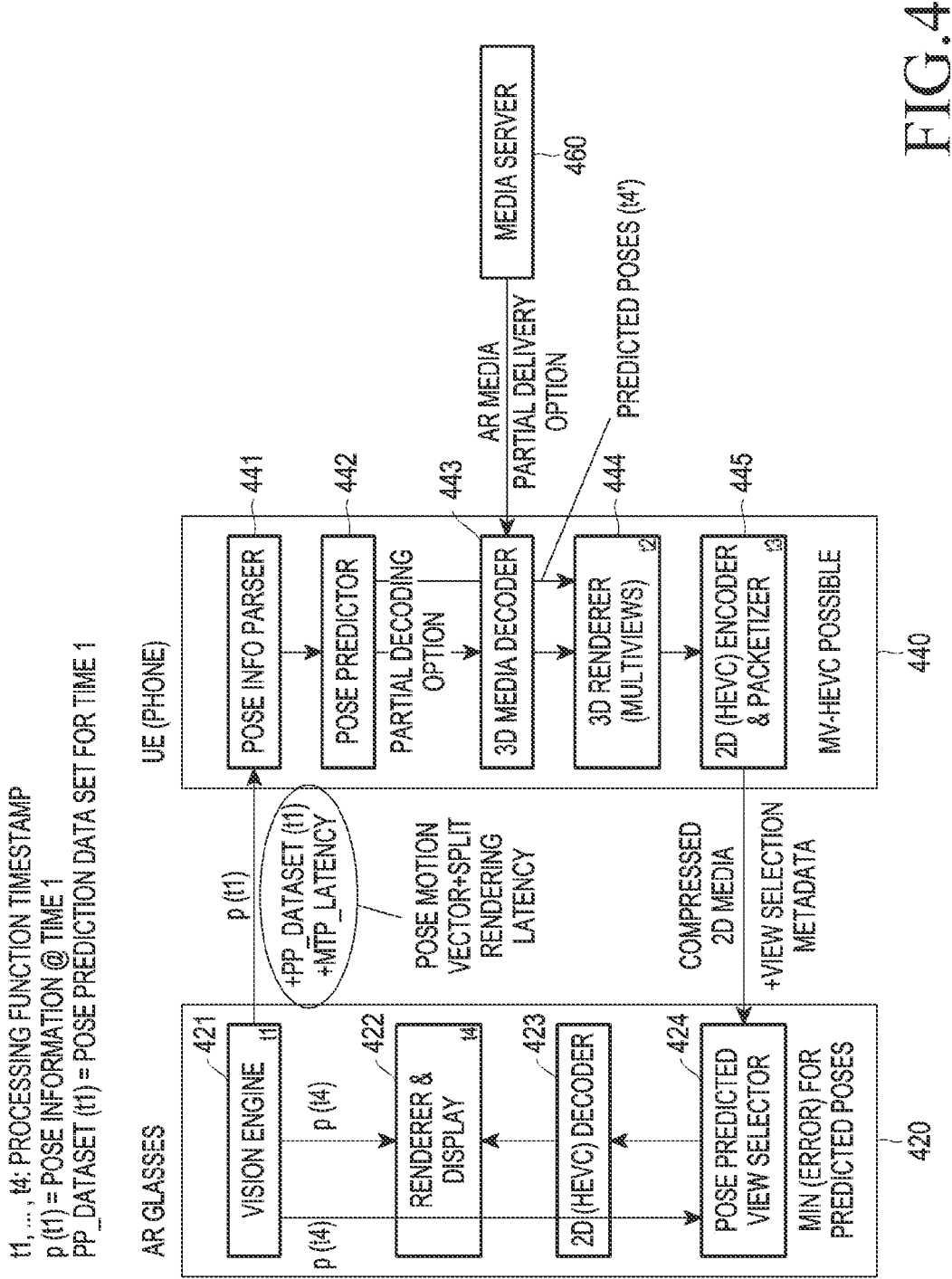
FIG. 4 is a view illustrating split rendering using latency compensated pose prediction (LCPP) in a communication system supporting XR/AR according to an embodiment of the disclosure.

FIG. 4 is a view illustrating split rendering using latency compensated pose prediction (LCPP) in a communication system supporting XR/AR according to an embodiment of the disclosure.

FIG. 4 exemplifies a configuration in which split rendering is performed between two devices 420 and 440 in a communication environment in which AR data, as multimedia content, is provided from a media server 460. In FIG. 4, the device 420 may be AR glasses, and the device 440 may be a UE. Split rendering is performed on AR data between the devices 420 and 440. The AR glasses 420 of FIG. 4 include a vision engine 421, a renderer and display 422, a 2D decoder 423, and a pose predicted view selector 424, and the UE 440 includes a pose information parser 441, a pose predictor 442, a 3D media decoder 443, a 3D renderer 444, and a 2D encoder and packetizer 445. FIG. 4 illustrates an example of a configuration for split rendering in which rendering for 3D media data requiring a relatively high processing capability is performed by the UE 440, and rendering for 2D media data requiring a relatively low processing capability is performed by the AR glasses 420. The AR glasses 420 may be connected to the UE 440 through tethering to receive the media data split rendered by the UE 440.

In the example of FIG. 4, the UE 440 may download the 3D media data from the media server 460 and provide it to the AR glasses 420. Split rendering is performed between the UE 440 and the AR glasses 420, and pose prediction is performed by the UE 440.

In the example of FIG. 4, specific operations of performing split rendering are operations 401 to 409 below.

401. The UE 440 downloads 3D media data from the media server 460. The 3D media data may be provided through a streaming service or a download service.

402. The AR glasses 420 transmits, to the UE 440, at least one of the user's pose information P(t1) (pose information at time t1), PP_dataset(t1) (pose prediction data set for time t1), and motion to photon (MTP) latency information MTP_latency (e.g., predicted MTP latency given by the previous (t4−t1) value, calculated using, e.g., the average of the previous MTP latencies). The pose information parser 441 of the UE 440 parses at least one of the pose information, the pose prediction data set, and the MTP latency information received from the vision engine 421 of the AR glasses 420.

403. The pose predictor 442 of the UE 440 performs pose prediction using at least one of the P(t1), PP_dataset(t1), and MTP latency, outputting, e.g., multiple pieces of predicted pose information P'(t4'). A specific scheme of the pose prediction according to the disclosure is described below.

404. The 3D media decoder 443 of the UE 440 depacketizes and decodes the 3D media data received from the media server 460, and then, the 3D renderer 444 of the UE 440 renders a plurality of 2D view video frames based on the pose information predicted in operation 403.

405. The 2D encoder and packetizer 445 of the UE 440 encodes and packetizes the view rendered in operation 404 using a 2D codec.

406. The UE 440 transmits the compressed media packet and view selection metadata to the AR glasses 420.

407. The pose predicted view selector 424 of the AR glasses 420 processes the view selection metadata to select a pose predicted view (rendered view frame). A specific scheme of the pose predicted view selection according to the disclosure is described below.

408. The 2D decoder 423 of the AR glasses 420 depacketizes and decodes the rendered view frame selected in operation 407.

409. The renderer and display 422 of the AR glasses 420 compensates for all possible, or at least some, rendered view frame error mismatches using the latest pose information @t4 at time t4 (e.g., time warping and late stage reprojection known in image processing art may be used).

As compared with the example of FIG. 2, which uses pose information P'(t2) and uses the estimated pose at time t2, the embodiment of FIG. 4 renders view(s) using more accurate predicted pose information P'(t4') than P'(t2), compared with the pose information P(t4) at time t4, thereby reducing rendering errors.

Meanwhile, in an embodiment, some of operations 401 to 409 described in the example of FIG. 4 may be omitted, or other necessary actions may be added. Further, each operation may be performed in an order different from the execution order of the operations of the above-described procedure.

Figure 5:
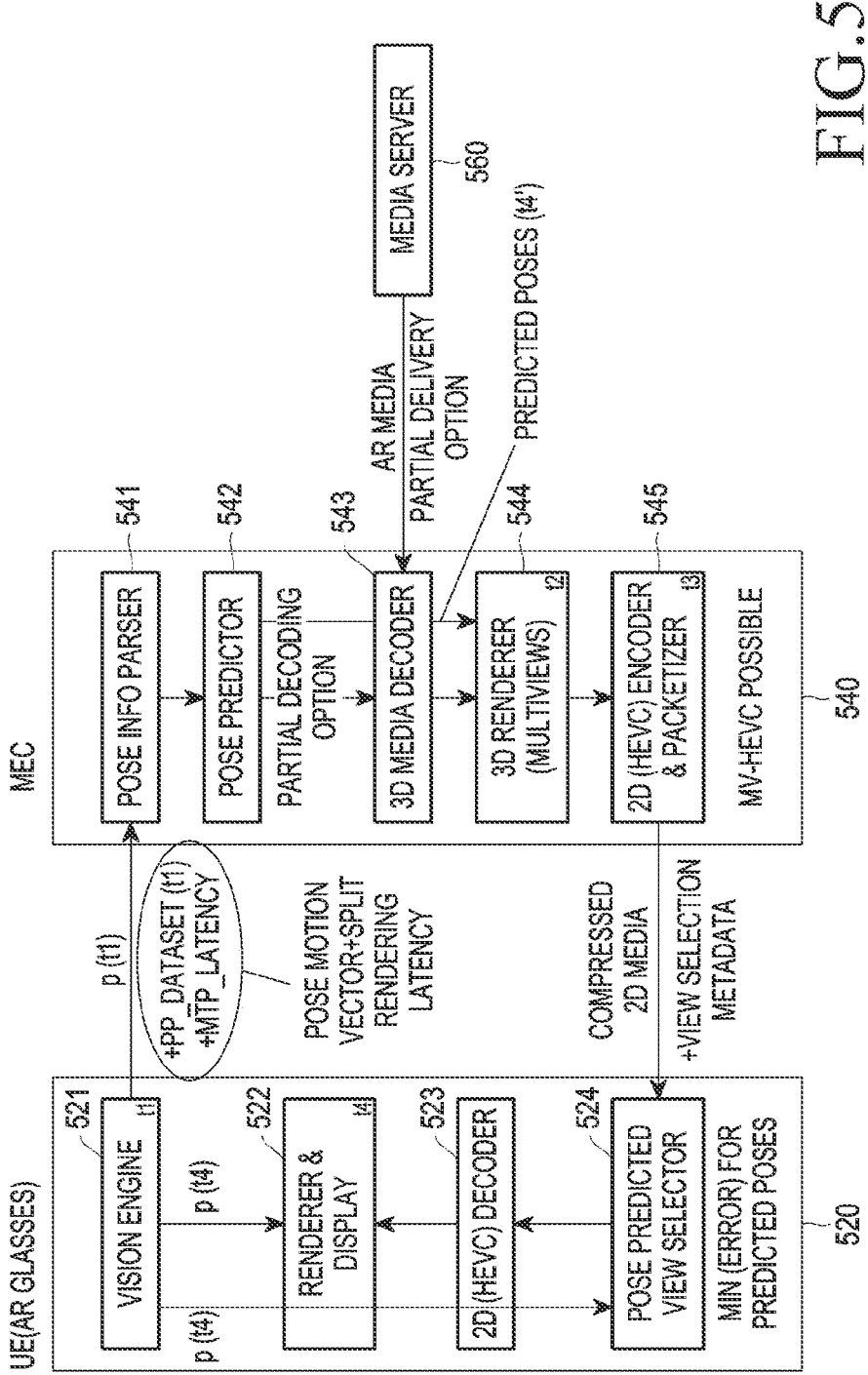
FIG. 5 is a view illustrating remote rendering using latency compensated pose prediction (LCPP) in a communication system supporting XR/AR according to an embodiment of the disclosure.

FIG. 5 is a view illustrating remote rendering using latency compensated pose prediction (LCPP) in a communication system supporting XR/AR according to an embodiment of the disclosure. In other words, FIG. 5 illustrates a flow and procedure of latency compensated pose prediction (LCPP)-based remote rendering between standalone AR glasses and a cloud processing entity (cloud server or MEC).

FIG. 5 exemplifies a configuration in which remote rendering is performed between two devices 520 and 540 in a communication environment in which AR data, as 3D multimedia data, is provided from a media server 560. In FIG. 5, the device 520 may be a UE using AR glasses, or AR glasses, and the device 540 may be an MEC. Remote rendering is performed on AR data between the devices 520 and 540. The AR glasses 520 of FIG. 5 include a vision engine 521, a renderer and display 522, a 2D decoder 523, and a pose predicted view selector 524, and the MEC 540 includes a pose information parser 541, a pose predictor 542, a 3D media decoder 543, a 3D renderer 544, and a 2D encoder and packetizer 545. FIG. 5 illustrates an example of a configuration for remote rendering in which rendering for 3D media data requiring a relatively high processing capability is performed by the MEC 540, and rendering for 2D media data requiring a relatively low processing capability is performed by the UE or AR glasses 520. The UE using the AR glasses or the AR glasses 520 (hereinafter, referred to as the AR glasses 520 for convenience) may be communicatively connected to the MEC 540 to receive media data remote-rendered by the MEC 540.

In the example of FIG. 5, the MEC 540 may gather 3D media data from the media server 560 and remote-renders the gathered 3D media data and provides it to the AR glasses 520. Remote rendering is performed between the AR glasses 520 and the MEC 540, and pose prediction is performed by the MEC 540.

In the example of FIG. 5, specific operations of performing remote rendering are operations 501 to 509 below.

501. The MEC 540 gathers 3D media data from the media server 560.

502. The AR glasses 520 transmits, to the MEC 540, at least one of the user's pose information P(t1) (pose information at time t1), PP_dataset(t1) (pose prediction data set for time t1), and MTP latency information MTP_latency (e.g., predicted MTP latency given by the previous (t4−t1) value, calculated using, e.g., the average of the previous MTP latencies). The pose information parser 541 of the MEC 540 parses at least one of the pose information, the pose prediction data set, and the MTP latency information received from the vision engine 521 of the AR glasses 520.

503. The pose predictor 542 of the MEC 540 performs pose prediction using at least one of the P(t1), PP_dataset (t1), and MTP_latency, outputting, e.g., multiple pieces of predicted pose information P'(t4'). A specific scheme of the pose prediction according to the disclosure is described below.

504. The 3D media decoder 543 of the MEC 540 depacketizes and decodes the 3D media data received from the media server 560, and then, the 3D renderer 544 of the MEC 540 renders a plurality of 2D view video frames based on the pose information predicted in operation 503.

505. The 2D encoder and packetizer 545 of the MEC 540 encodes and packetizes the view rendered in operation 504 using a 2D codec.

506. The MEC 540 transmits the compressed media packet and view selection metadata to the AR glasses 520.

507. The pose predicted view selector 524 of the AR glasses 520 processes the view selection metadata to select a pose predicted view. A specific scheme of the pose predicted view selection according to the disclosure is described below.

508. The 2D decoder 523 of the AR glasses 520 depacketizes and decodes the rendered view frame selected in operation 507.

509. The renderer and display 522 of the AR glasses 520 compensates for all possible, or at least some, MEC rendered view frame error mismatches using the latest pose information @t4 at time t4 (e.g., time warping and late stage reprojection known in image processing art may be used).

The remote rendering scenario in the embodiment of FIG. 5 may have a higher latency for the wireless data channel (transmittance through, e.g., a 5G mobile network) between the AR glasses and the MEC as compared with a short-range tethered wireless channel (e.g., transmittance on Wi-Fi 6E) between the AR glasses and the UE in the embodiment of FIG. 4. Thus, a pose prediction rendered view compensated more accurately and better may be required in the remote rendering scenario.

Meanwhile, in an embodiment, some of operations 501 to 509 described in the example of FIG. 5 may be omitted, or other necessary actions may be added. Further, each operation may be performed in an order different from the execution order of the operations of the above-described procedure.

Figure 6:
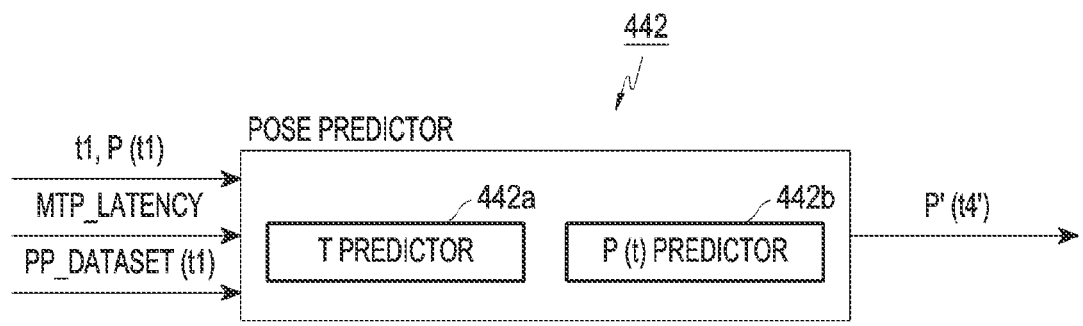
FIG. 6 is a view illustrating an example of a configuration of a pose prediction device for pose prediction according to an embodiment of the disclosure.

FIG. 6 is a view illustrating an example of a configuration of a pose prediction device for pose prediction according to an embodiment of the disclosure.

The pose prediction device of FIG. 6 is an example configuration of the pose predictor 442 in the example of FIG. 4 and may be applied to pose predictors according to other embodiments in the same/similar manner, as well as the example of FIG. 5.

The pose predictor 442 of FIG. 6 includes a t predictor 442a and a P(t) predictor 442b, and input parameters t1, P(t1), PP_dataset(t1), and MTP_latency are described as follows. Among the input parameters, t1 may be obtained from, e.g., the time stamp of P(t10) or be input separately. In the example of FIG. 6, t' and P'(t'), which are t and P(t) marked with the prime symbol, mean the predicted values.

Input Parameters:
t1: Time (UTC) to transmit pose information to UE/MEC by AR glasses
P(t1): Pose information about the user at time t1
position(x, y, z) [vector coordinates]
orientation(q, r, s, t) [quaternion]
P(t1)=P(position(t1), orientation(t1))
MTP_latency: (a) Predicted MTP latency given by the previous (t4−t1)
PP_dataset(t1): A data set based on the user's motion at time t1 that is used to predict the future pose at a specific time
For position: Unit conversion orientation [orientation quaternion], conversion speed
For orientation: Unit rotation orientation [rotation quaternion], rotation speed FIG. 6 illustrates a device operation for pose prediction described as a "pose predictor 442" processing entity (the device performing the operation may differ depending on the scenarios in the drawings corresponding to the embodiments of the disclosure).

The functions and operations of the t predictor 442a and the P(t) predictor 442b included as sub blocks in the pose predictor 442 of FIG. 6 are described below.

t Predictor

The t predictor 442a takes t1 and MTP_latency (and any other varying factors) as inputs to predict the time when the frame to be rendered by the AR glasses is to be displayed. Since t1 and MTP_latency both are data transmitted before actual 3D rendering process, additional processing latencies by the device (e.g., the UE or MEC) performing pose prediction and 3D rendering or by other devices processing load states may be considered (there may be a difference in UE/MEC processing latency, e.g., possible variations in factors due to 3D rendering, and the latency therefor may vary depending on media characteristics).

The t predictor 442a outputs the display time t4' predicted according to Equation1 below.

$$t4'=(t1+\text{MTP\_latency}+\text{UE processing latency difference, e.g., 3D rendering}) \quad \text{[Equation 1]}$$

P(t) Predictor

The P(t) predictor 442b takes t1, t4', P(t1), and PP_dataset (t1) (pose motion vector taken at time t1) as inputs to predict the pose for the frame to be displayed (rendered) on the AR glasses according to t4' from the output of the t predictor 442*a*.

In FIG. 6, the P(t) predictor 442*b* outputs the predicted pose information P'(t4') as shown in Equation 2 according to the operation.

$$\Delta(\text{position}) = (\text{3D conversion}) = (\text{conversion speed} \times (t4'-t1)) \times \text{unit conversion orientation}$$

$$\Delta(\text{orientation}) = (\text{3D rotation}) = (\text{rotation speed} \times (t4'-t1)) \times \text{unit rotation orientation}$$

$$P'(t4') = P(\text{position}(t1) + \Delta(\text{position}), \text{orientation}(t1) + \Delta(\text{orientation})) \quad \text{[Equation 2]}$$

In Equation 2, the operation of calculating A (position) and A (orientation) may differ depending on implementations, and may include other varying factors, such as guard volumes or motion vector drift variation for the predicted pose information. Another method may include estimating the pose information P'(t4') using an auto regression method instead of the motion vector. As another example, pose prediction may be based on media context, in relation to a scheme predicted to view, e.g., a 3D (AR) object in a specific orientation due to the user's region of interest/orientation/space and/or the characteristics of the 3D(AR) object.

Figure 7:
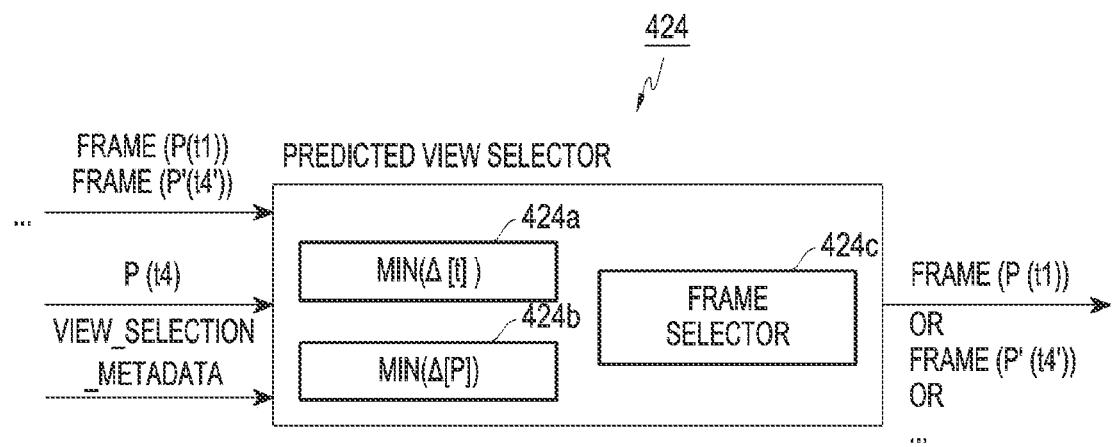
FIG. 7 is a view illustrating an example of a configuration of a pose predicted view selection device for predicted view selection according to an embodiment of the disclosure.

FIG. 7 is a view illustrating an example of a configuration of a pose predicted view selection device for predicted view selection according to an embodiment of the disclosure.

The pose predicted view selection device of FIG. 7 is an example configuration of the pose predicted view selector 424 in the example of FIG. 4 and may be applied to pose predicted view selectors according to other embodiments in the same/similar manner, as well as the example of FIG. 5.

The pose predicted view selector 424 of FIG. 7 includes a min(Δ[t]) 424*a*, a min(Δ[P]) 424*b*, and a frame selector 424*c*, and related input parameters are described below. In the example of FIG. 7, Frame (P'(t')) marked with the prime (') means the predicted result.

Input Parameters:
Frame(P(t1)): A frame rendered (compressed) according to the pose at time t1
Frame(P'(t4')): A frame rendered (compressed) according to the predicted pose at the predicted time t2'
P(t4): Actual pose at time t4
view_selection_metadata: A dataset containing pose and time information used to render available frames for predictive view selection.
Data set for frame (P(t1)): t1, P(t1)
Data set for frame (P'(t4')): t4', P'(t4')

FIG. 7 illustrates a device operation for predicted view selection described as a "pose predicted view selector 424" processing entity (the device performing the operation may differ depending on the scenarios in the drawings corresponding to the embodiments of the disclosure).

The functions and operations of the min(Δ[t]) 424*a*, min(Δ[P]) 424*b*, and the frame selector 424*c* included as sub blocks in the pose predicted view selector 424 of FIG. 7 are described below.

min(Δ[t])
The min(Δ[t]) 424*a* minimizes the error difference between the predicted time (e.g., t4' or t4") and the actual display time t4 using Equation 3 below.

$$\bullet \min(|t4'-t4|, |t4''-t4|, \ldots) \quad \text{[Equation 3]}$$

By selecting the predicted times t4', t4", t4''', ..., that minimize the difference between the actual display time t4 and the predicted display time in Equation 3, the most accurate predicted display time may be obtained and be used for time-sensitive applications during frame selection.

min(Δ[P])
The min(Δ[P]) 424*b* minimizes the error difference between the actual pose at time t4 and the pose predicted at the predicted time for the rendered frame using Equation 4.

$$\bullet \min(|P(\text{position}(t4)) - P'(\text{position}(t4'))|, |P(\text{position}(t4)) - P'(\text{position}(t4''))|, \ldots)$$

$$\bullet \min(|P(\text{orientation}(t4)) - P'(\text{orientation}(t4'))|, |P(\text{orientation}(t4)) - P'(\text{orientation}(t4''))|, \ldots) \quad \text{[Equation 4]}$$

As another example, rather than using only the pose information predicted at the predicted display time, pose information (such as P (position/orientation(t2)) updated/estimated/predicted at another processing time may also be considered in the minimization function.

Frame Selector
The frame selector 424*c* selects the most accurate rendered view based on a combination of the minimization errors output from the min(Δ[t]) 424*a* and the min(Δ[P]) 424*b* and output it as the pose predicted view. The output of the frame selector 424*c* is used as the output of the pose predicted view selector 424 as follows.

Output: Frame(P(t1)) or frame(P'(t4')) or frame(P'(t4")) or frame(P'(t2)) ...

Figure 8:
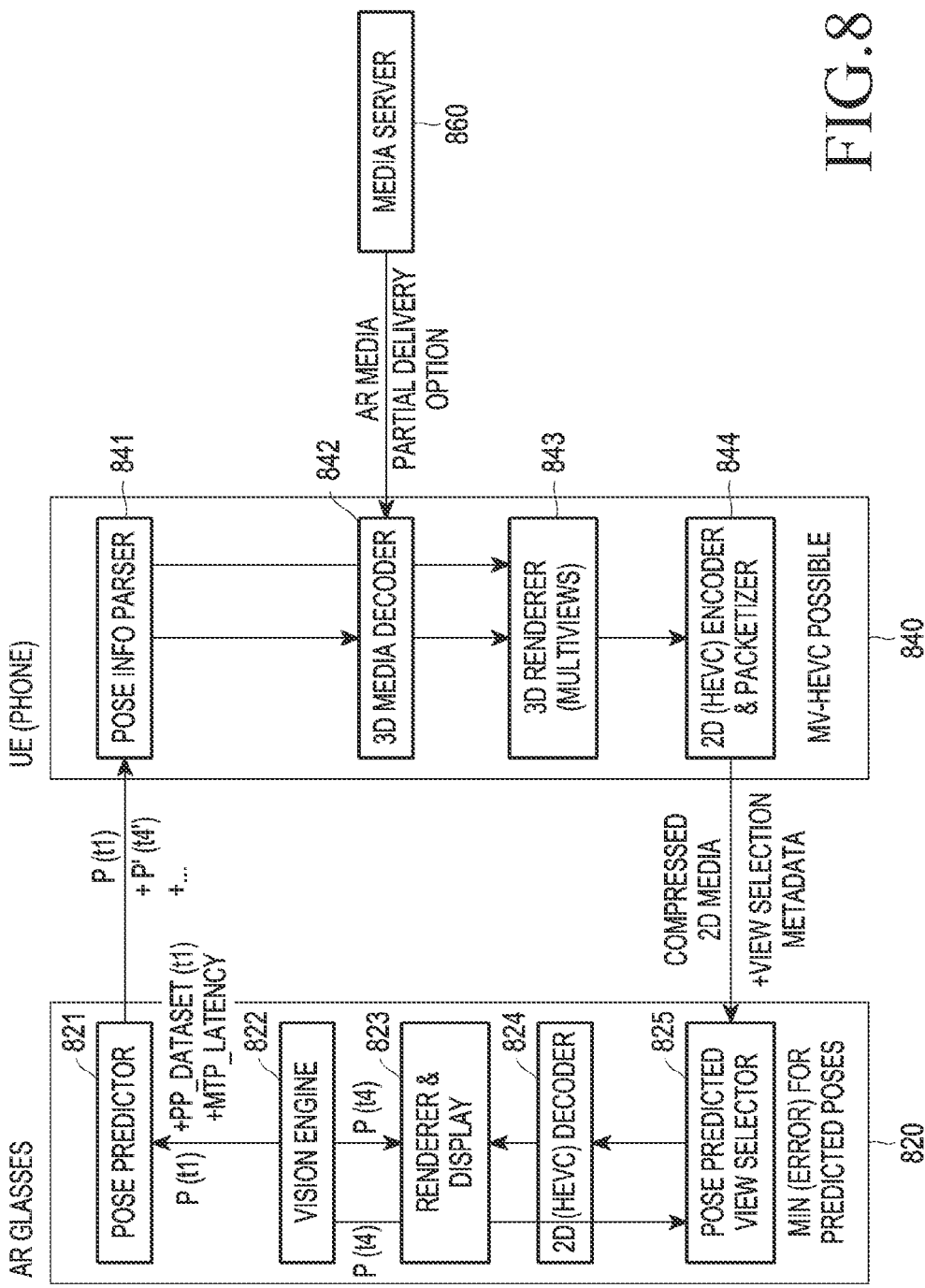
FIG. 8 is a view illustrating split rendering using latency compensated pose prediction (LCPP) in a communication system supporting XR/AR according to another embodiment of the disclosure.

The pose predictor 442 described in connection with FIG. 6 may be included in the UE as shown in FIG. 4 or be included in the AR glasses as shown in FIG. 8.

FIG. 8 is a view illustrating split rendering using latency compensated pose prediction (LCPP) in a communication system supporting XR/AR according to another embodiment of the disclosure. FIG. 8 exemplifies a case in which multiple pose predicted views are rendered by the UE.

FIG. 8 exemplifies a configuration in which split rendering is performed between two devices 820 and 840 in a communication environment in which AR data, as 3D multimedia data, is provided from a media server 860. In FIG. 8, the device 820 may be AR glasses, and the device 840 may be a UE. Split rendering is performed on AR data between the devices 820 and 840. The AR glasses 820 of FIG. 8 include a pose predictor 821, a vision engine 822, a renderer and display 823, a 2D decoder 824, and a pose predicted view selector 825, and the UE 840 includes a pose information parser 841, a 3D media decoder 842, a 3D renderer 843, and a 2D encoder and packetizer 844. FIG. 4 exemplifies a configuration in which the pose predictor 442 is included in the UE 440, and FIG. 8 exemplifies a configuration in which the pose predictor 821 is included in the AR glasses 820.

FIG. 8 illustrates an example of a configuration for split rendering in which rendering for 3D media data requiring a relatively high processing capability is performed by the UE 840, and rendering for 2D media data requiring a relatively low processing capability is performed by the AR glasses 820. The AR glasses 820 may be connected to the UE 840 through tethering to receive the media data split rendered by the UE 840.

In the example of FIG. 8, the UE 840 may download the 3D media data from the media server 860 and provide it to the AR glasses 820. Split rendering is performed between the UE 840 and the AR glasses 820, and pose prediction may be prediction on multiple poses and be performed by the AR glasses 820. Multiple pose predicted views may be rendered by the UE 840 by the prediction on the multiple poses.

In the example of FIG. 8, specific operations of performing split rendering are operations 801 to 809 below.

801. The UE 840 downloads 3D media data from the media server 860. The 3D media data may be provided through a streaming service or a download service.

802. The pose predictor 821 of the AR glasses 820 performs pose prediction as described in connection with FIG. 6, using at least one of the user's pose information P(t1), pose prediction data set PP_dataset(t1) and MTP latency information MTP_latency.

803. The AR glasses 820 transmits the user's pose information P(t1) and multiple predicted pose information P'(t4') . . . to the UE 840, and the pose information parser 841 of the UE 840 parses the information received from the pose predictor 821 of the AR glasses 820.

804. The 3D media decoder 842 of the UE 840 depacketizes and decodes the 3D media data received from the media server 860, and then, the 3D renderer 843 of the UE 840 renders a plurality of 2D view video frames based on the pose information received, parsed, and predicted in operation 803.

805. The 2D encoder and packetizer 844 of the UE 840 encodes and packetizes the view rendered in operation 804 using a 2D codec.

806. The UE 840 transmits the compressed media packet and view selection metadata to the AR glasses 820.

807. The pose prediction view selector 825 of the AR glasses 820 processes the view selection metadata to select a pose predicted view (rendered view frame) as described in connection with FIG. 7.

808. The 2D decoder 824 of the AR glasses 820 depacketizes and decodes the rendered view frame selected in operation 807.

809. The renderer and display 422 of the AR glasses 820 compensates for all possible, or at least some, rendered view frame error mismatches using the latest pose information @t4 (e.g., time warping and late stage reprojection known in image processing art may be used).

Meanwhile, in an embodiment, some of operations 801 to 809 described in the example of FIG. 8 may be omitted, or other necessary actions may be added. Further, each operation may be performed in an order different from the execution order of the operations of the above-described procedure.

Figure 9:
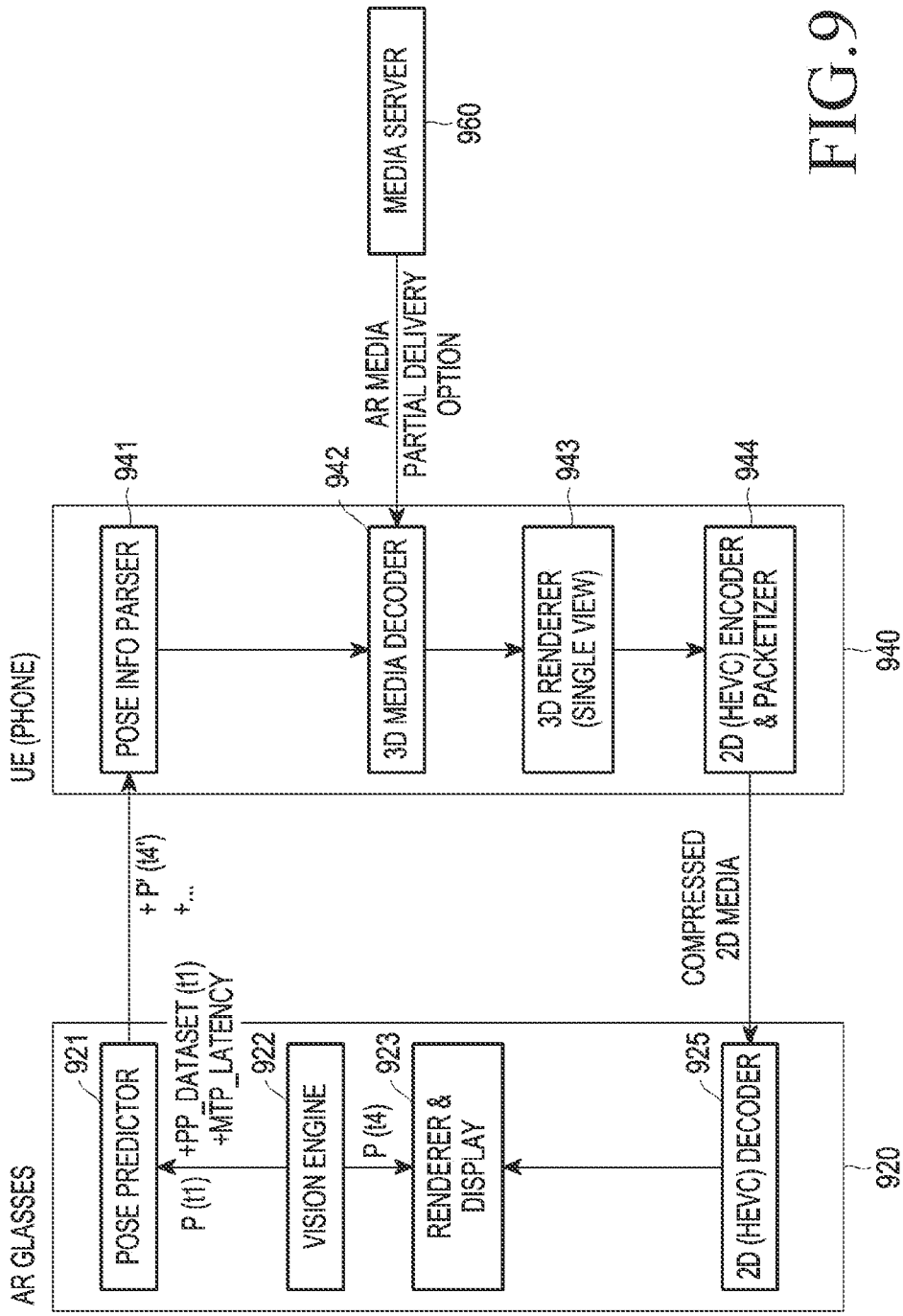
FIG. 9 is a view illustrating split rendering using latency compensated pose prediction (LCPP) in a communication system supporting XR/AR according to another embodiment of the disclosure.

The pose predictor 442 described in connection with FIG. 6 may be included in the UE as shown in FIG. 4 or be included in the AR glasses as shown in FIG. 9.

FIG. 9 is a view illustrating split rendering using latency compensated pose prediction (LCPP) in a communication system supporting XR/AR according to another embodiment of the disclosure. FIG. 9 exemplifies a case in which a single pose predicted view is rendered by the UE.

FIG. 9 exemplifies a configuration in which split rendering is performed between two devices 920 and 940 in a communication environment in which AR data, as 3D multimedia data, is provided from a media server 960. In FIG. 9, the device 920 may be AR glasses, and the device 940 may be a UE. Split rendering is performed on AR data between the devices 920 and 940. The AR glasses 920 of FIG. 9 include a pose predictor 921, a vision engine 922, a renderer and display 923, and a 2D decoder 924, and the UE 940 includes a pose information parser 941, a 3D media decoder 942, a 3D renderer 943, and a 2D encoder and packetizer 944. In the example of FIG. 9, since a single pose predicted view is rendered by the UE 940, the AR glasses 920 does not require a pose predicted view selector 825 as shown in FIG. 8.

In the example of FIG. 9, the UE 940 may download the 3D media data from the media server 960 and provide it to the AR glasses 920. Split rendering is performed between the UE 940 and the AR glasses 920, and pose prediction may be prediction on a single pose and be performed by the AR glasses 920. A single pose predicted views may be rendered by the UE 940 by the prediction on the single pose.

In the example of FIG. 9, specific operations of performing split rendering are operations 901 to 909 below.

901. The UE 940 downloads 3D media data from the media server 960. The 3D media data may be provided through a streaming service or a download service.

902. The pose predictor 921 of the AR glasses 920 performs pose prediction as described in connection with FIG. 6, using at least one of the user's pose information P(t1), pose prediction data set PP_dataset(t1) and MTP latency information MTP_latency.

903. The AR glasses 920 transmits the single predicted pose information P'(t4') to the UE 940, and the pose information parser 941 of the UE 940 parses the information received from the pose predictor 921 of the AR glasses 920.

904. The 3D media decoder 942 of the UE 940 depacketizes and decodes the 3D media data received from the media server 960, and then, the 3D renderer 943 of the UE 940 renders a single 2D view video frame based on the UE's predicted pose P'(t4') received and parsed in operation 903.

905. The 2D encoder and packetizer 944 of the UE 940 encodes and packetizes the single view rendered in operation 804 using a 2D codec.

906. The UE 940 transmits the compressed media packet to the AR glasses.

907. The 2D decoder 824 of the AR glasses 920 depacketizes and decodes the rendered single view frame received from the UE 940.

908. The renderer and display 422 of the AR glasses 920 compensates for all possible, or at least some, rendered view frame error mismatches using the latest pose information @t4 (e.g., time warping and late stage reprojection known in image processing art may be used).

Meanwhile, in an embodiment, some of operations 901 to 909 described in the example of FIG. 9 may be omitted, or other necessary actions may be added. Further, each operation may be performed in an order different from the execution order of the operations of the above-described procedure.

In the disclosure, as another embodiment of the example of FIG. 5 describing remote rendering using the latency compensated pose prediction (LCPP), an additional roundtrip request may be performed between the display and the 3D rendering entities (e.g., the AR glasses and MEC shown in FIG. 10) to avoid overlap of the bandwidths to transmit multiple predicted views (because only one optimal view is selected).

Figure 10:
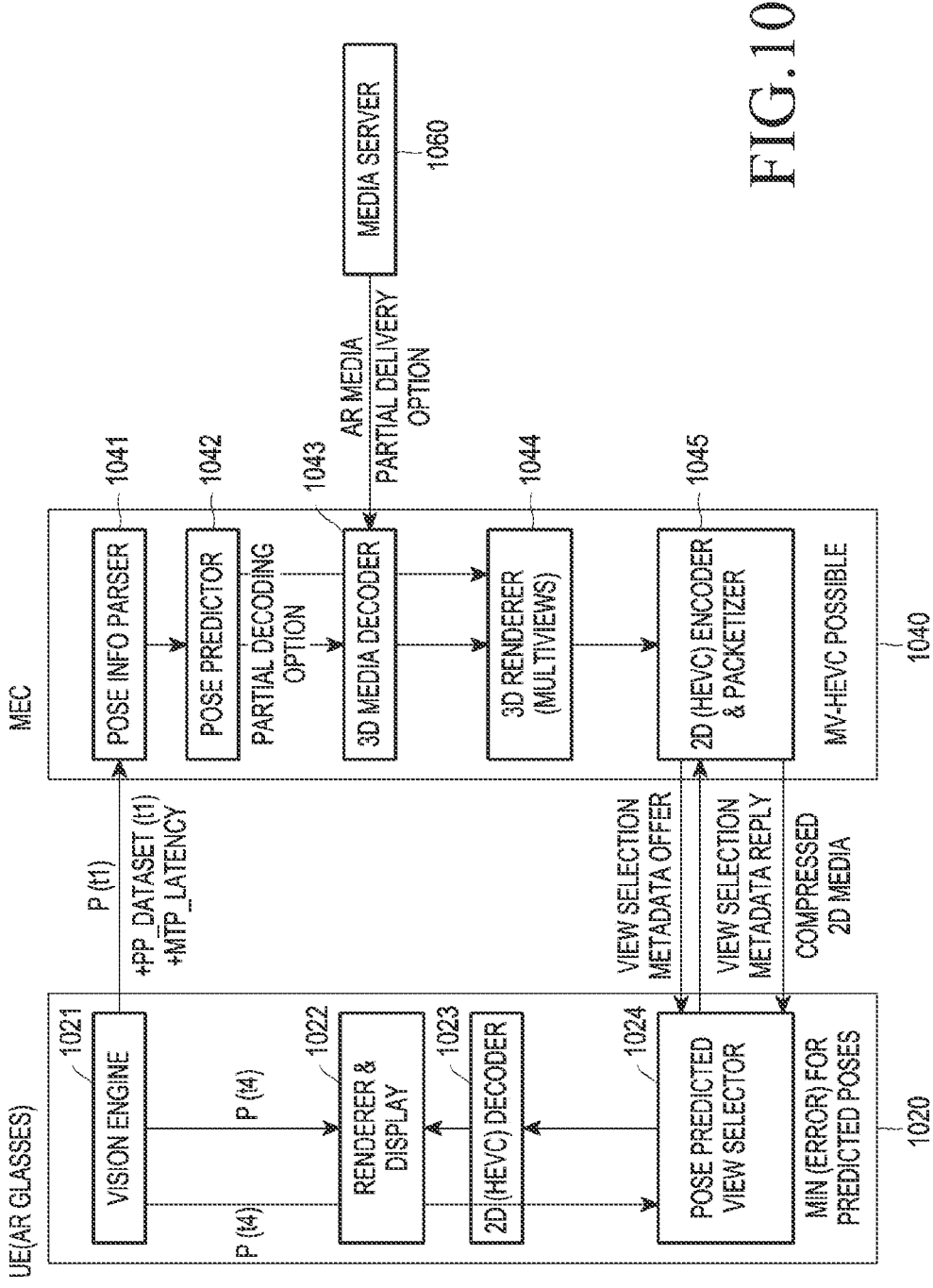
FIG. 10 is a view illustrating remote rendering using latency compensated pose prediction (LCPP) in a communication system supporting XR/AR according to an embodiment of the disclosure.

FIG. 10 is a view illustrating remote rendering using latency compensated pose prediction (LCPP) in a communication system supporting XR/AR according to an embodiment of the disclosure.

FIG. 10 exemplifies a configuration in which remote rendering is performed between two devices 1020 and 1040 in a communication environment in which AR data, as 3D multimedia data, is provided from a media server 1060. In FIG. 10, the device 1020 may be a UE using AR glasses, or AR glasses, and the device 1040 may be an MEC. Remote rendering is performed on AR data between the devices 1020 and 1040. The AR glasses 1020 of FIG. 10 include a vision engine 1021, a renderer and display 1022, a 2D decoder 1023, and a pose predicted view selector 1024, and the MEC 1040 includes a pose information parser 1041, a pose predictor 1042, a 3D media decoder 1043, a 3D renderer 1044, and a 2D encoder and packetizer 1045. FIG. 10 illustrates an example of a configuration for remote rendering in which rendering for 3D media data requiring a relatively high processing capability is performed by the MEC 1040, and rendering for 2D media data requiring a relatively low processing capability is performed by the UE or AR glasses 1020. The UE using the AR glasses or the AR glasses 1020 (hereinafter, referred to as the AR glasses 1020 for convenience) may be communicatively connected to the MEC 1040 to receive media data remote-rendered by the MEC 1040.

In the example of FIG. 10, the MEC 1040 may gather 3D media data from the media server 1060 and remote-renders the gathered 3D media data and provides it to the AR glasses 1020. Remote rendering is performed between the AR glasses 1020 and the MEC 1040, and pose prediction is performed by the MEC 1040.

In the example of FIG. 10, specific operations of performing remote rendering are operations 1001 to 1011 below.

1001. The MEC 1040 gathers media data from the media server 1060.

1002. The AR glasses 1020 transmits, to the MEC 1040, at least one of the user's pose information P(t1) (pose information at time t1), PP_dataset(t1) (pose prediction data set for time t1), and MTP latency information MTP latency (e.g., the MTP latency calculated using, e.g., the average of the previous MTP latencies). The pose information parser 1041 of the MEC 1040 parses at least one of the pose information, the pose prediction data set, and the MTP latency information received from the vision engine 1021 of the AR glasses 1020.

1003. The pose predictor 1042 of the MEC 1040 performs pose prediction using at least one of the P(t1), PP_dataset (t1), and MTP_latency, outputting, e.g., multiple pieces of predicted pose information.

1004. The 3D media decoder 1043 of the MEC 1040 depacketizes and decodes the 3D media data received from the media server 1060, and then, the 3D renderer 1044 of the MEC 1040 renders a plurality of 2D view video frames based on the pose information predicted in operation 1003.

1005. The 2D encoder and packetizer 1045 of the MEC 1040 encodes and packetizes the view rendered in operation 1004 using a 2D codec.

1006. The MEC 1040 sends a view selection metadata suggestion to the AR glasses 1020.

1007. The pose prediction view selector 524 of the AR glasses 1020 processes the view selection metadata, received from the MEC 1040, to select a pose predicted view.

1008. The AR glasses 1020 transmits a view selection metadata response including the request for the selected view to the MEC 1040.

1009. The MEC 1040 transmits a compressed media packet including the selected view (rendered view frame) to the AR glasses 1020 based on the view selection metadata response received from the AR glasses 1020.

1010. The 2D decoder 1023 of the AR glasses 1020 depacketizes and decodes the rendered view frame received in operation 1009.

1011. The renderer and display 1022 of the AR glasses 1020 compensates for all possible, or at least some, MEC rendered view frame error mismatches using the latest pose information (e.g., time warping and late stage reprojection known in image processing art may be used).

Meanwhile, in an embodiment, some of operations 1001 to 1011 described in the example of FIG. 10 may be omitted, or other necessary actions may be added. Further, each operation may be performed in an order different from the execution order of the operations of the above-described procedure.

Figure 11:
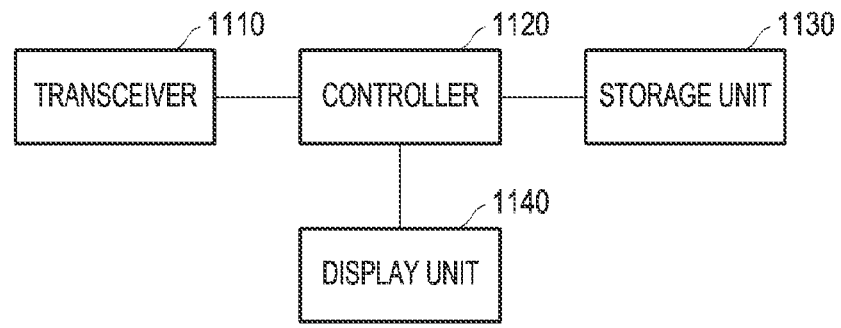
FIG. 11 is a view illustrating a configuration of AR glasses according to an embodiment of the disclosure.

FIG. 11 is a view illustrating a configuration of AR glasses according to an embodiment of the disclosure. Further, the configuration of FIG. 10 may be a VR device or various devices capable of displaying 3D media data.

Referring to FIG. 11, the AR glasses may include a transceiver 1110, a controller 1120, a storage unit 1130, and a display unit 1140. In the disclosure, the controller 1120 may be defined as a circuit or application-specific integrated circuit or at least one processor. The transceiver 1110 may transmit and receive signals to/from other network entities via wireless/wired communication. The transceiver 1110 may transmit/receive XR/AR data to/from, e.g., a media server, another electronic device, and/or an MEC. The transceiver 1110 may be referred to as a transmission/reception unit.

The controller 1120 may control the overall operation of the AR glasses according to each of the embodiments of FIGS. 1 to 10 proposed in the disclosure or a combination of at least one embodiment thereof. For example, the controller 1120 may control the signal flow between the blocks to perform the operations described in connection with the embodiments of FIGS. 1 to 10. Specifically, the controller 1120 may control the operations for remote/split rendering using the latency compensated pose prediction (LCPP) according to an embodiment of the disclosure.

The storage unit 1130 may store at least one of information transmitted/received via the transceiver 1110 and information generated/processed via the controller 1120. For example, the storage unit 1130 may store information used for the operations for remote/split rendering using the latency compensated pose prediction (LCPP).

The display unit 1140 may display at least one of information transmitted/received via the transceiver 1110 and information generated/processed via the controller 1120. For example, the display unit 1140 may display XR/AR data.

Figure 12:
FIG. 12 is a view illustrating a structure of an electronic device according to an embodiment of the disclosure.

FIG. 12 is a view illustrating a structure of an electronic device according to an embodiment of the disclosure. In the embodiment of FIG. 11, the electronic device may be a UE (e.g., a smart phone, a mobile phone, etc.) connected to the AR/XR glasses.

Referring to FIG. 12, the electronic device may include a transceiver 1210, a controller 1220, and a storage unit 1230. In the disclosure, the controller 1220 may be defined as a circuit or application-specific integrated circuit or at least one processor.

The transceiver 1210 may transmit and receive signals to/from other network entities. The transceiver 1210 may transmit/receive XR/AR data to/from, e.g., a media server, another electronic device, and/or an MEC. The transceiver 1210 may be referred to as a transmission/reception unit.

The controller 1220 may control the overall operation of the electronic device according to each of the embodiments of FIGS. 1 to 10 proposed in the disclosure or a combination of at least one embodiment thereof. For example, the controller 1220 may control the signal flow between the blocks to perform the operations described in connection with the embodiments of FIGS. 1 to 10. Specifically, the controller 1220 may control the operations for remote/split rendering using the latency compensated pose prediction (LCPP) according to an embodiment of the disclosure.

The storage unit 1230 may store at least one of information transmitted/received via the transceiver 1210 and information generated/processed via the controller 1220. For example, the storage unit 1230 may store information used for the operations for remote/split rendering using the latency compensated pose prediction (LCPP).

Figure 13:
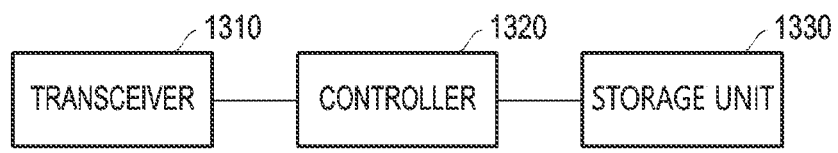
FIG. 13 is a view illustrating a configuration of a remote renderer according to an embodiment of the disclosure.

FIG. 13 is a view illustrating a configuration of a remote renderer according to an embodiment of the disclosure. In the embodiment of FIG. 13, the remote renderer may be, e.g., an MEC communicatively connected with the AR/XR glasses or the UE. Further, the remote renderer of FIG. 13 may be, e.g., a server connected to the network.

Referring to FIG. 13, the remote renderer may include a transceiver 1310, a controller 1320, and a storage unit 1330. In the disclosure, the controller 1320 may be defined as a circuit or application-specific integrated circuit or at least one processor.

The transceiver 1310 may transmit and receive signals to/from other network entities. The transceiver 1310 may transmit/receive XR/AR data to/from, e.g., a media server, another electronic device, and/or AR glasses. The transceiver 1110 may be referred to as a transmission/reception unit.

The controller 1320 may control the overall operation of the remote renderer according to each of the embodiments of FIGS. 1 to 10 proposed in the disclosure or a combination of at least one embodiment thereof. For example, the controller 1320 may control the signal flow between the blocks to perform the operations described in connection with the embodiments of FIGS. 1 to 10. Specifically, the controller 1320 may control the operations for remote rendering using the latency compensated pose prediction (LCPP) according to an embodiment of the disclosure.

The storage unit 1330 may store at least one of information transmitted/received via the transceiver 1310 and information generated/processed via the controller 1320. For example, the storage unit 1330 may store information used for the operations for remote rendering using the latency compensated pose prediction (LCPP).

Further, in the disclosure, the media server may have a device configuration including a transceiver, a controller, and a storage unit as in the example of FIG. 13 and be implemented as a server device providing 3D media data, such as AR data, to the UE or the MEC through the network.

The embodiments herein are provided merely for better understanding of the present invention, and the present invention should not be limited thereto or thereby. In other words, it is apparent to one of ordinary skill in the art that various changes may be made thereto without departing from the scope of the present invention. Further, the embodiments may be practiced in combination.

The invention claimed is:

1. A method for performing rendering by a first device receiving 3D media data from a media server in a communication system, the method comprising:
   receiving pose prediction-related information of a first time from augmented reality (AR) glasses;
   performing pose prediction of a second time to generate one or more pose prediction results of the second time, based on the pose prediction-related information of the first time;
   rendering one or more 2D pose prediction views for the received 3D media data, based on the one or more pose prediction results of the second time;
   encoding the rendered one or more 2D pose prediction views to compress 2D media data; and
   transmitting the encoded 2D media data to the AR glasses,
   wherein the pose prediction-related information of the first time includes pose information of the first time, a pose prediction data set of the first time, and motion to photon (MTP) latency information, and
   wherein the MTP latency information indicates an MTP latency predicted by a time difference between the second time and the first time, and the MTP latency including a processing time for the 3D media data.

2. The method of claim 1, wherein the pose information of the first time includes information indicating a user's position and orientation of the first time, and
   wherein the pose prediction data set of the first time includes data indicating a unit conversion orientation and conversion speed and a unit rotation orientation and rotation speed based on the user's motion of the first time used to predict a pose of the second time.

3. The method of claim 1, further comprising transmitting metadata for view selection from among the one or more 2D pose prediction views to the AR glasses when rendering the one or more 2D pose prediction views.

4. The method of claim 1, wherein when the first device is a UE connected through tethering with the AR glasses, split rendering is performed on the 3D media data between the UE and the AR glasses, and
   wherein when the first device is a server device receiving the 3D media data from a cloud network, remote rendering is performed on the 3D media data between the UE using the AR glasses and the server device.

5. A method for performing rendering by augmented reality (AR) glasses communicatively connected with a first device receiving 3D media data from a media server in a communication system, the method comprising:
   transmitting pose prediction-related information of a first time to the first device;
   receiving compressed 2D media data including one or more 2D pose prediction views for the 3D media data from the first device, based on the pose prediction-related information of the first time;
   decoding encoded media data of a 2D pose prediction view selected from among the one or more 2D pose prediction views; and
   compensating for a frame error mismatch of the selected 2D pose prediction view, based on pose information of a second time at which 2D rendering is to be performed on the selected 2D pose prediction view by the AR glasses,
   wherein the one or more 2D pose prediction views are pose-predicted for the second time at which the 2D rendering is to be performed by the AR glasses,
   wherein the pose prediction-related information of the first time includes pose information of the first time, a pose prediction data set of the first time, and motion to photon (MTP) latency information, and
   wherein the MTP latency information indicates an MTP latency predicted by a time difference between the second time and the first time, and the MTP latency including a processing time for the 3D media data.

6. The method of claim 5, wherein the pose information of the first time includes information indicating a user's position and orientation of the first time, and
   wherein the pose prediction data set of the first time includes data indicating a unit conversion orientation and conversion speed and a unit rotation orientation and rotation speed based on the user's motion of the first time used to predict a pose of the second time.

7. The method of claim 5, further comprising receiving metadata for view selection from among the one or more 2D pose prediction views from the first device when receiving the one or more 2D pose prediction views from the first device.

8. The method of claim 7, further comprising selecting a rendered view to minimize an error mismatch between an actual pose of the second time and a pose predicted of the second time, based on the received metadata,
wherein the metadata includes pose information and time information used to select the rendered view.

9. A first device receiving 3D media data from a media server in a communication system, comprising:
a transceiver; and
a processor configured to,
receive, through the transceiver, pose prediction-related information of a first time from augmented reality (AR) glasses,
perform pose prediction of a second time to generate one or more pose prediction results of the second time, based on the pose prediction-related information of the first time,
render one or more 2D pose prediction views for the received 3D media data, based on the one or more pose prediction results of the second time,
encode the rendered one or more 2D pose prediction views to compress 2D media data, and
transmit, through the transceiver, the encoded 2D media data to the AR glasses,
wherein the pose prediction-related information of the first time includes pose information of the first time, a pose prediction data set of the first time, and motion to photon (MTP) latency information, and
wherein the MTP latency information indicates an MTP latency predicted by a time difference between the second time and the first time, and the MTP latency including a processing time for the 3D media data.

10. The first device of claim 9, wherein the processor is further configured to transmit, through the transceiver, metadata for view selection from among the one or more 2D pose prediction views to the AR glasses when rendering the one or more 2D pose prediction views.

11. The first device of claim 9, wherein when the first device is a UE connected through tethering with the AR glasses, split rendering is performed on the 3D media data between the UE and the AR glasses, and when the first device is a server device receiving the 3D media data from a cloud network, remote rendering is performed on the 3D media data between the UE using the AR glasses and the server device.

12. Augmented reality (AR) glasses communicatively connected with a first device receiving 3D media data from a media server in a communication system, comprising:
a transceiver; and
a processor configured to,
transmit, through the transceiver, pose prediction-related information of a first time to the first device,
receive, through the transceiver, compressed 2D media data including one or more 2D pose prediction views for the 3D media data from the first device, based on the pose prediction-related information of the first time,
decode encoded media data of a 2D pose prediction view selected from among the one or more 2D pose prediction views, and
compensate for a frame error mismatch of the selected 2D pose prediction view, based on pose information of a second time at which 2D rendering is to be performed on the selected 2D pose prediction view by the AR glasses,
wherein the one or more 2D pose prediction views are pose-predicted for the second time at which the 2D rendering is to be performed by the AR glasses,
wherein the pose prediction-related information of the first time includes pose information of the first time, a pose prediction data set of the first time, and motion to photon (MTP) latency information, and
wherein the MTP latency information indicates an MTP latency predicted by a time difference between the second time and the first time, and the MTP latency including a processing time for the 3D media data.

* * * * *